United States Patent [19]
Sievert

[11] 3,765,234
[45] Oct. 16, 1973

[54] METHOD FOR DETERMINING THE NET TORQUE AND THE INSTANTANEOUS HORSEPOWER OF A PUMPING UNIT

[76] Inventor: John A. Sievert, 128 S. Osage, Ponca City, Okla.

[22] Filed: July 9, 1970

[21] Appl. No.: 53,614

[52] U.S. Cl..................... 73/136 R, 73/151, 73/168
[51] Int. Cl. .............................................. G01l 3/00
[58] Field of Search...................... 73/133, 168, 136, 73/151

[56] References Cited
UNITED STATES PATENTS

| | | | |
|---|---|---|---|
| 2,691,300 | 10/1954 | Morris | 73/136 |
| 2,596,361 | 5/1952 | Blancher | 73/151 X |
| 2,791,375 | 5/1957 | Piety | 73/168 X |
| 3,343,409 | 9/1967 | Gibbs | 73/151 |
| 3,527,094 | 9/1970 | Yew et al. | 73/151 |

*Primary Examiner*—Charles A. Ruehl
*Attorney*—Joseph C. Kotarski, Henry H. Huth, Robert B. Coleman, Jr., William J. Miller and David H. Hill

[57] ABSTRACT

A method for determining the imposed instantaneous net torque and instantaneous horsepower of a pumping unit, wherein the true angular position of the output shaft of the pumping unit gear box is utilized in determining the particular torque factor. The method generally consists of determining the actual or measured polished rod displacement and the polished rod load of a particular pumping unit as functions of time for a complete pumping period. The measured polished rod displacement is then compared with a table of calculated polished rod displacements to determine a corresponding crank angle or a corresponding calculated polished rod displacement. The calculated torque factor for the corresponding calculated polished rod displacement or the corresponding crank angle is then utilized to determine the imposed instantaneous net torque and instantaneous horsepower of the pumping unit.

7 Claims, 3 Drawing Figures

PATENTED OCT 16 1973

3,765,234

INVENTOR
JOHN A. SIEVERT

BY
William J. Miller
ATTORNEY 3,765,234

METHOD FOR DETERMINING THE NET TORQUE AND THE INSTANTANEOUS HORSEPOWER OF A PUMPING UNIT

BACKGROUND OF THE INVENTION

1. Field of Invention

This invention relates generally to a method for determining the operating characteristics of a pumping unit, and more particularly, but not by way of limitation, to a method for determining the instantaneous net torque and the instantaneous horsepower of a pumping unit.

2. Description of the Prior Art

In the past the net torque required for a pumping unit has been determined to be the algebraic sum of the well-load torque and the counterbalance torque, the algebraic expression being as follows:

Net Torque = torque × net − counterbalance
factor polished torque
rod load

Once the net torque has been determined in accordance with the above formula, the horsepower required for a particular pumping unit was then calculated in the usual manner.

In the past, the particular torque factor which has been utilized in the above algebraic expression has been determined based on a particlar type of pumping unit, and assuming a constant angular velocity of the output shaft of the pumping unit gear box. It has been found that the angular velocity of the output shaft of the pumping unit gear box is not constant over the complete pumping period and, thus, this method many times resulted in an erroneous determination of the net well load for a given polished rod displacement. This method, therefore, resulted in an erroneous determination of the instantaneous net torque imposed on a particular pumping unit, and consequently an erroneous determination of the horsepower required. Since the instantaneous net torque and horsepower are critical parameters in the analysis of the performance of a particular pumping unit, it is imperative that these particular performance parameters be accurately determined.

SUMMARY OF THE INVENTION

The present invention contemplates an improved method for determining the instantaneous net torque of a pumping unit having a polished rod, wherein a particular measured polished rod displacement is compared with a plurality of calculated polished rod displacements to determine a corresponding calculated polished rod displacement value, and the calculated torque factor corresponding to the corresponding calculated polished rod displacement is utilized to determine the instantaneous net torque of the pumping unit.

An object of the invention is to provide a more accurate method for determining the instantaneous net torque and the instantaneous horsepower of a pumping unit.

Another object of the invention is to provide a more accurate method for determining the torque factor to be utilized in calculating various performance parameters of a pumping unit.

One further object of the invention is to provide a more accurate method for determining various performance parameters of a pumping unit.

Other objects and advantages of the invention will be evident from the following detailed description when read in conjunction with the accompanying drawings.

DESCRIPTION OF THE PREFERRED EMBODIMENT

Figure 1:
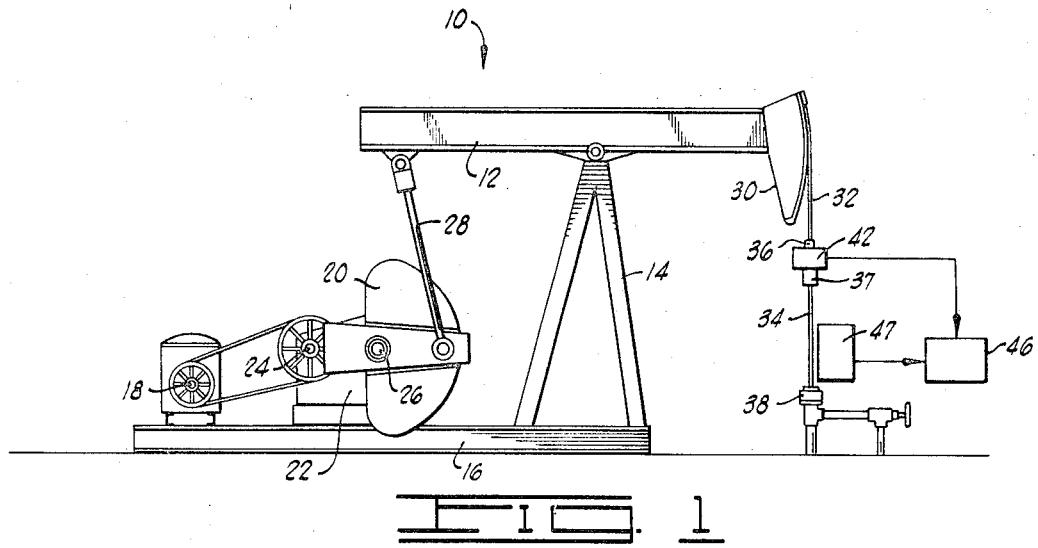
FIG. 1 is a pictorial view of a typical pumping unit, having a "Class I" geometry.

Various types of surface and subsurface equipment are utilized to pump fluids, such as oil, from an underground reservoir. One such typical pumping unit is shown in FIG. 1, and designated by the general reference character 10. The pumping unit 10 is of a type well-known in the art and generally referred to as a conventional beam-type pumping unit, having a walking beam 12 fulcrumed on a Sampson post 14, which is suitably anchored to a platform 16.

A power source 18 is connected to a crank arm 20 via a pumping unit gear box 22. More particularly, the power source 18 is connected to the input gear shaft 24 of the pumping unit gear box 22, and the crank arm 20 is connected to the output gear shaft 26 of the pumping unit gear box 22. The pumping unit gear box 22 contains various reduction gears, adapted to reduce the speed at which the prime mover 18 rotates, so that the output gear shaft 26, and consequently the crank arm 20, rotate at a preselected speed for the particular pumping unit 10.

The crank arm 20 is pivotally connected to one end of a pitman arm 28, and the opposite end of the pitman arm 28 is pivotally connected to one end of the walking beam 12. The other end of the walking beam 12 has a hanger 30 affixed thereto, of the type well-known in the art and commonly referred to as a "horse head."

A hanger cable 32 is removably affixed to the horse head 30. The hanger cable 32 is secured to a polished rod 34 by a clamp 36 and a carrier bar 37. The polished rod 34 extends through a stuffing box 38 at the well head, and the polished rod 34 is then connected to a series of sucker rods, forming the rod string which extends into the well casing. This general type of pumping unit is well known in the art, and a detailed description of the interconnection and operation of the various components, described above, is not required herein.

In general, the present method is adapted to determine the instantaneous net torque, and consequently the instantaneous horsepower, required at the output gear shaft 26 of the pumping unit gear box 22. It should be noted that, although the method is initially described with reference to a pumping unit of the type shown in FIG. 1, the method may be utilized to determine the instantaneous net torque and instantaneous horsepower of the various classes or types of pumping units presently utilized in the art.

The instantaneous net torque at the output shaft 26 of the pumping unit gear box 22 is the algebraic sum of the net well torque and the counterbalance torque. The net torque may be generally expressed mathematically as follows:

$NT = TF \, (PRL) - CBT$ where:

NT = the net torque;
TF = the torque factor
PRL = the net polished rod load; and
CBT = the counterbalance torque.

The maximum counterbalance effect at the polished rod for a particular pumping unit is usually determined in the field. Various methods are utilized for determining the maximum counterblance effect from which the counterbalance torque may be calculated. One such method is to position the crank arm 20 parallel to the surface of the platform 16, an in a position facing or extending toward the well head. The polished rod is then clamped-off, or isolated, so that the only force being exerted thereon is the force of the counterbalance weights. This force, or counterbalance effect, is then determined utilizing a load cell attached to a portion of the polished rod above the well head. The various methods for determining the counterbalance effect, such as the one described above, are well known in the art and no further description is required herein.

The measured polished rod load and the actual polished rod displacement, each as a function of time, are then determined or, in other words, measured to determine the measured polished rod load and the measured polished rod displacement for the particular pumping unit. Both of these parameters may be determined in the field, utilizing a strain-gauge load cell, and a displacement transducer.

As shown diagrammatically in FIG. 1, a strain-gauge or load cell 42 is attached about the polished rod 34 at a point or position generally above the well head, in such a manner that the loads acting on the carrier bar 37 are transmitted through the load cell 42. The load cell 42 may be of the conventional type, which is available from such manufactureres as, for example, Lockheed Electronics Company of Houston, Tex.

The load cell 42 is electrically connected to one channel of a dual-channel recorder 46. A displacement transducer 47 is physically connected to the polished rod 34, and the displacement transducer 47 is electrically connected to the second channel of the recorder 46, as diagrammatically indicated in FIG. 1. The particular displacement transducer 47 is also of the conventional type, available from such manufacturers as Lockheed Electronics Company of Houston, Tex.

The particular recorder 46 is available from such manufacturers as The Sanborn Corp. of New Haven, Conn. The recorder 46 is adapted to provide a visual readout showing the measured polished rod load as a function of time and the measured polished rod displacement as a function of time. The equipment, that is the strain gauge load cell 42, the displacement transducer 47, and the recorder 46, and the interconnection therebetween are all well known in the art and no further detailed description is required herein.

The pumping period for the particular pumping unit is determined in a usual manner. The pumping period, of course, is the time required for the crank arm 20 to complete one cycle, that is the time required for the crank arm 20 to rotate 360°.

The measured polished rod displacements are then put into the form of a table, listing the time unit intervals and the particular measured polished rod displacement corresponding to the particular time unit. This particular step is not necessary in actual practice since the information can be conveniently stored in a computer. However, the table form is useful to illustrate the method contemplated by the present invention.

In one actual test which was conducted on a particular pumping unit, the measured counterbalance effect was 18,716 lbs. and the measured pumping period was 5.9 seconds. For this particular pumping unit, Table I, below, "Measured Displacement Data" shows the measured polished rod displacement for each particular time interval unit, that is, 0.1 seconds. It should be noted that this particular pumping unit will also be utilized below to illustrate the various other steps contemplated by the present invention.

TABLE I

MEASURED DISPLACEMENT DATA

| Time (Seconds) | Measured Polished Rod Displacement (In) | Time (Seconds) | Measured Polished Rod Displacement (In) |
|---|---|---|---|
| 0.0 | −4.480 | 3.0 | −103.264 |
| 0.1 | −5.152 | 3.1 | −103.712 |
| 0.2 | −6.272 | 3.2 | −103.936 |
| 0.3 | −8.512 | 3.3 | −103.712 |
| 0.4 | −11.424 | 3.4 | −103.040 |
| 0.5 | −14.784 | 3.5 | −101.696 |
| 0.6 | −18.368 | 3.6 | −99.904 |
| 0.7 | −22.848 | 3.7 | −99.992 |
| 0.8 | −27.328 | 3.8 | −93.408 |
| 0.9 | −31.808 | 3.9 | −89.152 |
| 1.0 | −36.288 | 4.0 | −84.000 |
| 1.1 | −40.544 | 4.1 | −79.296 |
| 1.2 | −45.024 | 4.2 | −73.920 |
| 1.3 | −49.504 | 4.3 | −67.872 |
| 1.4 | −54.208 | 4.4 | −62.272 |
| 1.5 | −58.464 | 4.5 | −56.448 |
| 1.6 | −62.496 | 4.6 | −50.624 |
| 1.7 | −66.752 | 4.7 | −44.800 |
| 1.8 | −70.560 | 4.8 | −39.424 |
| 1.9 | −74.592 | 4.9 | −33.600 |
| 2.0 | −78.176 | 5.0 | −29.344 |
| 2.1 | −81.536 | 5.1 | −24.864 |
| 2.2 | −85.120 | 5.2 | −19.936 |
| 2.3 | −88.256 | 5.3 | −16.352 |
| 2.4 | −91.168 | 5.4 | −12.992 |
| 2.5 | −93.856 | 5.5 | −9.856 |
| 2.6 | −96.544 | 5.6 | −7.168 |
| 2.7 | −98.784 | 5.7 | −5.824 |
| 2.8 | −100.800 | 5.8 | −4.704 |
| 2.9 | −102.144 | 5.9 | −4.480 |

The measured displacements of the polished rod are then normalized, thereby placing each measured polished rod displacement in the form of dimensionless quantity. This is particularly important where the displacement transducer 47 is of the cable and reel driven type, since the placement of the displacement transducer 47 with respect to cable attachment on the polished rod may be such that the cable is initially extended a distance from the displacement transducer 47. It is apparent that in those instances where the cable is initially extended, each measured polished rod displacement will not reflect the true, various measured polished rod displacement. The normalizing of the various measured polished rod displacements corrects for this effect.

To normalize the measured displacements of the polished rod, the following mathematical expression is uitlized:

$$\overline{D_i} = (D_{max} - \overline{D_i}/D_{max} - D_{min})$$

where:
$\overline{D_i}$ = the normalized measured polished rod displacement at a particular time interval within the pumping period;

$D_{max}$ = the maximum measured polished rod displacemnt within the pumping period;

$D_{min}$ = the minimum measured polished rod displacement within the pumping period; and $D_i$ = the measured polished rod displacement at a particular time interval within the pumping period, this particular time interval corresponding to the particular time interval of the normalized measured polished rod displacement, $\overline{D_i}$, to be determined.

For example, using the actual test, mentioned above, and the data shown in Table I, above, the normalized displacement, $\overline{D_i}$, at 0.8 seconds, is determined as follows:

$\overline{D_{.8}} = (-4.480 - (-27.328)/-4.480 - (-103.936))$ where:

$\overline{D_{.8}}$ = the normalized measured polished rod displacement at 0.8 seconds.

$D_{max} = -4.480$ inches, the maximum measured polished rod displacement, as determined from Table I.

$D_{min} = -103.936$ inches, the minimum measured polished rod displacement, as determined from Table I.

$D_{.8} = -27.328$, the measured polished rod displacement at 0.8 seconds, as determined from Table I.

In the above example, $\overline{D_{.8}}$ is then determined to be 0.22973. The normalized measured polished rod displacement is utilized to determine the "torque factor," in a manner to be more fully described below.

From the dimensions of the particular pumping unit, the calculated polished rod displacement is determined or, in other words, calculated for each degree of rotation of the crank arm 20, or in other words for each degree of rotation of the output shaft 24 of the pumping unit gear box 22. For example, the pumping unit 10, shown in FIG. 1, is of the type generally designated as having "Class I" geometry. This particular type of pumping unit may then be kinematically illustrated, as shown in FIG. 2.

Figures 2, 3:
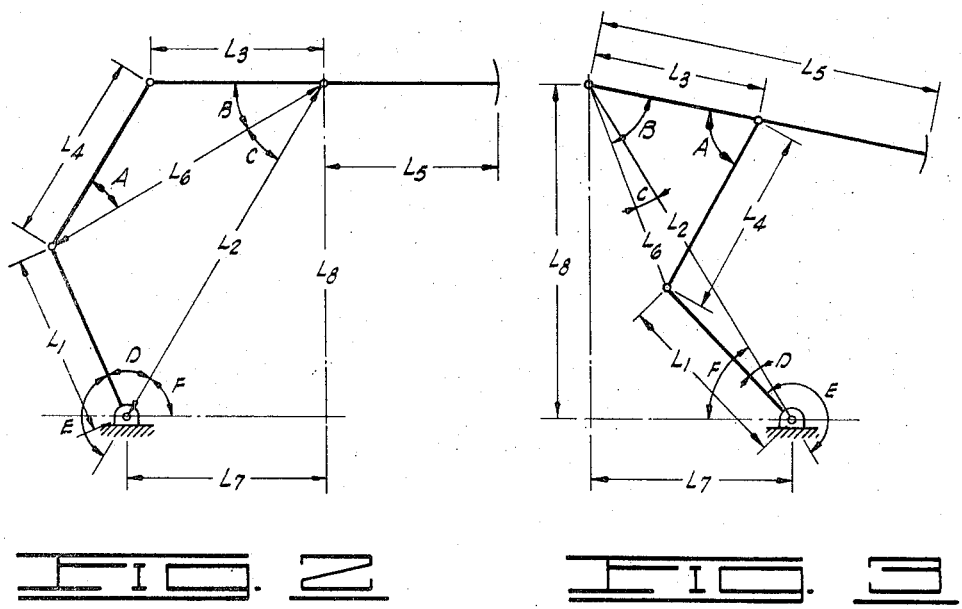
FIG. 2 is a kinematic representation of the pumping unit shown in FIG. 1.
FIG. 3 is a kinematic representation of a typical pumping unit, having a "Class III" geometry.

The pumping unit dimensions, in inches of $L_1$, $L_3$, $L_4$, $L_5$, $L_7$, and $L_8$, as shown in FIG. 2, consist of measurements which, in one form, are conducted in the field for a particular pumping unit. The particular pumping unit dimensions, noted above, may be defined generally as follows:

$L_1$ = the crank arm lengh, that is, the length between the center of the output shaft 26 and the center of the pivotal connection between the crank arm 26 and the pitman arm 28.

$L_3$ = the length between the center of the pivotal connection of the pitman arm 28 to the beam 12 and the center of the pivotal connection of the beam 12 to the Sampson post 14.

$L_4$ = the pitman length, that is, the length between the center pivotal connection of the pitman arm 28 to the crank arm 20 and the center of the pivotal connection of the pitman arm 28 to the beam 12.

$L_5$ = the driven bar length, that is, the length between the center of the pivotal connection if the beam 12 to the Sampson post 14 and a tangent drawn from the outermost arc formed by the horse head 30.

$L_7$ = the longitudinal distance between the center of the output shaft 26 and the center of the pivotal connection of the beam 12 to the Sampson post 14.

$L_8$ = the vertical distance between a longitudinal plane extending through the center of the output shaft 26, parallel to the platform 16, and the center of the pivotal connection of the beam 12 to the Sampson post 14.

From the dimensional or kinematic representation of the pumping unit 10, shown in FIG. 2, the calculated torque factor for any degree of rotation of the crank arm 20 can be determined or, in other words, calculated. The calculated torque factor is obtained by:

$TF = [L_1 L_4 L_5 \sin(C - E - A)/L_3 L_6 \sin B](X)(Y)$ where:

$X$ = a constant for the particular pumping unit and will be either a positive (+) or negative (−) sign. In the instance of a class I geometry, as shown in FIG. 2, the particular constant is a positive (+) sign and, in the instance of a class III geometry, as will be shown below, the particular constant is a negative (−) sign;

$Y$ = a constant for the direction of rotation. $Y = 1$, indicates the crank arm falls in a direction toward the sampson post, and $Y = -1$, indicates the crank arm falls in a direction away from the Sampson post;

angle $E$ = the particular crank angle;

angle $C = \cos^{-}([L_6^2 + L_2^2 - L_1^2/2 \cdot L_6 \cdot L_2])$;

angle $A = \sin^{-1}[L_3 \sin B/L_4]$; and where:

angle $B = \cos^{-1}[L_6^2 + L_3^2 - L_4^2/2 \cdot L_6 \cdot L_3]$; and $L_6 = \sqrt{L_1^2 + L_2^2 - 2 \cdot L_1 L_2 \cos E}$ From the dimensional or kinematic representation of the pumping unit 10, shown in FIG. 2, the calculated polished rod displacement can be determined or, in other words, calculated for each degree of rotation of the crank arm 20. The calculated polished rod displacement is obtained by:

calculated polished rod displacement = $(-L_5)(X)[\sin^{-1}(L_1 \sin E/L_6) + \cos^{-1}(L_6^2 + L_3^2 - L_4^2/2 \cdot L_3 L_6)]4)$ As shown above, from the kinematic representation of the particular pumping unit, the calculated polished rod displacement and the torque factor, each as a function of the crank angle can be determined. The above factors are preferably determined for each degree of rotation over the entire pumping period, that is for each degree rotation of the crank arm over 360°.

The calculated polished rod displacements are then normalized, to yield dimensionless quantities. The normalization of these displacements is accomplished in a manner similar to that utilized before to normalize the measured polished rod displacements:

$\overline{Z_i} = Z_{max} - Z_i/Z_{max} - Z_{min}$ (5)

where:

$\overline{Z_i}$ = the normalized calculated polished rod displacement at a particular time interval within the pumping period;

$Z_{max}$ = the maximum calculated polished rod displacement within the pumping period;

$Z_{min}$ = the minimum calculated polished rod displacement within the pumping period; and $Z_i$ = the calculated polished rod displacement at a particular time interval within the pumping period, this particular time interval coresponding to the particular time interval of the normalized calculated polished rod displacement $\overline{Z_i}$, to be determined.

Table II, below, shows selected values of the calculated polished rod displacements, the normalized calculated polished rod displacements, and the torque factor, each as a function of the crank angle, for a particular pumping unit. The particular values, shown in Table II, were determined for the particular pumping unit used in the example hereinbefore.

TABLE II
SELECTED VALUES OF CALCULATED POLISH ROD DISPLACEMENTS

| Crank Angle (degrees) | Calculated Polished Rod Displacement (inches) | Normalized Calculated Polished Rod Displacement | Torque Factor (inches) |
|---|---|---|---|
| 0.0 | −141.708 | 0.0 | 0.150176 |
| 52. | −119.074 | 0.226873 | 43.2868 |
| 53. | −118.316 | 0.234477 | 43.6367 |
| 61. | −112.066 | 0.297126 | 45.6636 |

The normalized measured polished rod displacement $\overline{(D_1)}$ at a particular time, is then compared to the normalized calculated polished rod displacements $\overline{(Z_i)}$, until a normalized calculated polished rod dsplacement $\overline{(Z_i)}$ is found which is equal to the particular normalized measured polished rod displacement $\overline{(D_i)}$. In other words, Table II is scanned until a value of $\overline{Z_i}$ is found which equals a particular $\overline{D_i}$. The torque factor for the corresponding normalized calculated polished rod displacement $\overline{(Z_i)}$ is then utilized in the net torque equation, (1), to determine the instantaneous net torque at that particular time for the particular pumping unit. If the exact corresponding value of the normalized calculated polished rod displacement $\overline{(Z_i)}$ is not found, the next value greater than the particular normalized measured polished rod displacement $\overline{(D_i)}$ is located, and the particular torque factor to the utilized is determined by interpolation.

It should be particularly noted that the abovedescribed method for determining the corresponding calculated torque factor is utilized in those instances where a complete table, such as indicated in Table II, has been determined. As a practical matter, the calculated torque factors need not be calculated for each crank angle. In this instance, the particular corresponding normalized calculated polished rod displacement $\overline{(Z_i)}$ is generally determined, as described above, and the particular crank angle corresponding to the corresponding normalized calculated polished rod displacement $\overline{(Z_i)}$ is then utilized in calculating the corresponding torque factor.

Once the net torque has been determined, in the manner described above, the instantaneous horsepower can be determined utilizing the standard conversion formulas, which are well known in the art.

As noted in the example referred to before, the normalized polished rod displacement at 0.8 seconds $\overline{(D_{.8})}$ was determined to be 0.22973. To determine the torque factor to be used in the calculation of the net torque at 0.8 seconds, the normalized calculated polished rod displacements $\overline{(Z_i)}$ are scanned to find a value equal to, or greater than 0.22973 $\overline{(D_{.8})}$. From Table II, it may be noted that this particular value lies between the normalized calculated polished rod displacements $\overline{(Z_i)}$ for 52° and 53°. Interpolation between the torque factor for 52° and the torque factor for 53 degrees yields a torque factor of 43.419.

This particular torque factor of 43.419 is then utilized to calculate the instantaneous net torque required by this particular pumping unit at 0.8 seconds, equation (1) above. Of course, the net torque, as determined above, can then be converted into the instantaneous horsepower, that is the horsepower required by the particular pumping unit at 0.8 seconds, utilizing standard equations well known in the art.

The method previously utilized in the art to determine the torque factor was simply to assume a constant angular velocity of the crank arm or output shaft of the pumping unit gear box, for all time intervals within the pumping period. Under this assumption, and using the same example referred to above, the crank angle at 0.8 seconds of elapsed time, is 61°. The torque factor corresponding to 61° is 45.664 inches, which is approximately 5 percent greater than the torque factor which is obtained utilizing the present method. It is apparent that a variation of this degree, that is 5 percent, can lead to many erroneous results, and quite possibly result in a prime mover or pumping unit gear box which is not properly sized for the particular pumping application.

The above discussion has been directed particularly to a pumping unit which may be described kinematically as a Class I system, as shown kinematically in FIG. 2. Shown in FIG. 3 is a kinematic representation of what may be referred to as a Class III type of pumping unit. In a Class III pumping unit, the pitman arm is pivotally connected to the walking beam on the opposite side of the sampson post, as compared to the Class I system.

From the kinematics point of view, various pumping units are also generally divided into additional classes depending upon whether the particular pumping unit is of the rotary counterbalance, beam counterbalance, or the air counterbalance type. The kinematic analysis of the various pumping units mentioned above will be apparent to those skilled in the art, considering the above-detailed description, with reference particularly to a Class I type of pumping unit. Therefore, the above-described method for determining the instantaneous net torque and consequently the instantaneous horsepower of a pumping unit, which has been particularly described with respect to a Class I type of pumping unit, applies equally well to the various types of pumping unit systems, generally mentioned above.

It will be apparent to those skilled in the art, that the determination of the instantaneous net torque and horsepower in a manner as described before can be accomplished via a computer. The precise program for the computer will, of course, vary, but can easily be developed by those skilled in such art, in view of the above-detailed description of the method.

The method described above for calculating the net torque required at the output shaft of the pumping unit gear box utilizes a torque factor which is obtained by considering the variations in the angular velocity of the crank arm over the pumping period. Utilizing the particular torque factor determined in this manner yields a much more accurate and realistic determination of the torque and horsepower requirements of a particular pumping unit. It is, therefore, possible to more accurately determine the size requirements of the prime mover and the pumping unit gear box for a particular pumping unit, and thus reduce the possibility of over-sizing or under-sizing these particular components.

The result can be a reduction in the amount of cost required to operate a particular pumping unit. If the prime mover is oversized, of course, more power is being utilized to operate the particular pumping unit than is actually required. Also, in this instance, the initial cost of the prime mover is probably more than necessary for the particular pumping unit. I the prime mover is undersized, the prime mover will be overloaded, thereby possibly resulting in premature failure of the prime mover. These same considerations also basically apply to the pumping unit gear box.

Changes may be made in the construction and arrangement of the parts or elements of the various embodiments, or the sequence and steps of the method described herein without departing from the spirit and scope of the invention as defined in the following claims.

What is claimed is:

1. A method for determining the instantaneous net torque of a pumping unit having a polished rod and a crank arm wherein the pumping period is the time required for the crank arm to rotate 360° and wherein the polished rod loads and the counterbalance torque of the pumping unit have been determined, the method comprising:

measuring actual polished rod displacements of the pumping unit to obtain measured polished rod displacements at particular time intervals over the pumping period;

calculating polished rod displacements from the dimensions of the pumping unit to obtain calculated polished rod displacements at particular angular positions of the crank arm over the pumping period;

calculating torque factors from the dimensions of the pumping unit to obtain calculated torque factors at particular angular positions of the crank arm over a complete pumping period;

comparing a particular measured polished rod displacement with the calculated polished rod displacements to determine a corresponding calculated polished rod displacement value;

determining the calculated torque factor corresponding to the corresponding calculated polished rod displacement; and calculating the instantaneous net torque of the pumping unit utilizing the counterbalance torque, the polished rod loads, and the calculated torque factor corresponding to the corresponding calculated polished rod displacement.

2. A method for determining the instantaneous net torque of a pumping unit having a polished rod and a crank arm wherein the pumping period is the time required for the crank arm to rotate 360° and wherein the counterbalance torque of the pumping unit has been determined, the method comprising:

measuring actual polished rod displacements of the pumping unit to obtain measured polished rod displacements at particular time intervals over the pumping period;

measuring the polished rod load of the pumping unit at particular time intervals over the pumping period to obtain measured polished rod loads;

calculating polished rod displacements from the dimensions of the pumping unit to obtain calculated polished rod displacements at particular angular positions of the crank arm over the pumping period;

comparing a particular measured polished rod displacement with the calcuated polished rod displacements to determine a corresponding calculated polished rod displacement value;

determining the crank angle corresponding to the corresponding calculated polished rod displacement;

calculating the calculated torque factor at the crank angle corresponding to the corresponding calculated polished rod displacement; and calculating the net torque of the pumping unit utilizing the counterbalance torque, the calculated torque factor and the measured polished rod load corresponding to the corresponding calculated polished rod displacement.

3. A method for determining the instantaneous net torque of a pumping unit having a polished rod and a crank arm wherein the pumping period is the time required for the crank arm to rotate 360° and wherein the polished rod loads and the counterbalance torque of the pumping unit have been determined, the method comprising:

measuring actual polished rod displacements of the pumping unit to obtain measured polished rod displacements at particular time intervals over the pumping period;

normalizing each measured polished rod displacement;

calculating from the dimensions of the particular pumping unit the calculated polished rod displacements at particular angular positions of the crank arm over the pumping period; normalizing each calculated polished rod displacement;

calculating from the dimensions of a particular pumping unit the calculated torque factor at particular angular positions of the crank arm over the pumping period;

scanning the calculated polished rod displacements to determine a calculated polished rod displacement corresponding to one predetermined measured polished rod displacement;

determining the calculated torque factor corresponding to the calculated polished rod displacement corresponding to the one predetermined measured polished rod displacement; and calculating the instantaneous net torque of the pumping unit utilizing the counterbalance torque, the polished rod loads, and the calculated torque factor corresponding to the corresponding calculated polished rod displacement.

4. A method for determining the instantaneous net torque of a pumping unit having a polished rod and a crank arm wherein the pumping period is the time required for the crank arm to rotate 360° and wherein the counterbalance torque of the pumping unit has been determined, the method comprising:

measuring actual polished rod displacements of the pumping unit to obtain measured polished rod displacements at particular time intervals over the pumping period;

measuring the polished rod load of the pumping unit at particular time intervals over the pumping period to obtain measured polished rod loads;

normalizing each measured polished rod displacement;

calculating from the dimensions of the particular pumping unit the calculated polished rod displacements at particular angular positions of the crank arm over the pumping period;

normalizing each calculated polished rod displacement;

scanning the normalized calculated polished rod displacements to determine a normalized calculated polished rod displacement corresponding to one predetermined normalized measured polished rod displacement;

determining the angular position of the crank arm corresponding to the normalized calculated polished rod displacement corresponding to the one predetermined normalized measured polished rod displacement;

calculating from the dimensions of a particular pumping unit the calculated torque factor at the particular angular position of the crank arm corresponding to the corresponding normalized calculated polished rod displacement; and calculating the instantaneous net torque of the pumping unit utilizing the counterbalance torque, the measured polished rod load and the calculated torque factor corresponding to the corresponding calculated polished rod displacement.

5. A method for determining the torque factor to be utilized in calculating various parameters of a pumping unit requiring a determination of the torque factor of the pumping unit, having a polished rod and a crank arm, the method comprising:

measuring actual polished rod displacements of the pumping unit to obtain measured polished rod displacements at particular time intervals;

calculating polished rod displacements from the dimensions of the pumping unit to obtain calculated polished rod displacements at particular angular positions of the crank arm;

calculating torque factors from the dimensions of the pumping unit to obtain calculated torque factors at particular angular positions of the crank arm;

comparing a particular measured polished rod displacement with the calculated polished rod displacements to determine a corresponding calculated polished rod displacement value; and determining the calculated torque factor corresponding to the corresponding calculated polished rod displacement.

6. A method for determining the torque factor to be utilized in calculating various parameters of a pumping unit requiring a determination of the torque factor of the pumping unit, having a polished rod and a crank arm, the method comprising:

measuring actual polished rod displacements of the pumping unit to obtain measured polished rod displacements at particular time intervals;

calculating polished rod displacements from the dimensions of the pumping unit to obtain calculated polished rod displacements at a particular angular position of the crank arm;

comparing a particular measured polished rod displacement with the calculated polished rod displacements to determine a corresponding calculated polished rod displacement value;

determining the crank angle corresponding to the corresponding calculated polished rod displacement; and calculating the calculated torque factor at the crank angle corresponding to the corresponding calculated polished rod displacement.

7. A method for determining the torque factor to be utilized in calculating various parameters of a pumping unit requiring a determination of the torque factor of the pumping unit, having a polished rod and a crank arm, the method comprising:

measuring actual polished rod displacements of the pumping unit to obtain measured polished rod displacements at particular time intervals;

normalizing the measured polished rod displacements;

calculating polished rod displacements from the dimensions of the pumping unit to obtain calculated polished rod displacements at particular angular positions of the crank arm;

normalizing the calculated polished rod displacements;

comparing a particular normalized measured polished rod displacement with the normalized calculated polished rod displacements to determine a corresponding normalized calculated polished rod displacement value;

determining the crank angle corresponding to the corresponding normalized calculated polished rod displacement; and calculating the calculated torque factor at the crank angle corresponding to the corresponding normalized calculated polished rod displacement.

* * * * *